United States Patent
Yoshida et al.

(10) Patent No.: US 8,400,727 B2
(45) Date of Patent: Mar. 19, 2013

(54) RECORDING DEVICE AND METHOD FOR POSITIONING ELECTROMAGNETIC TRANSDUCER

(75) Inventors: Yutaka Yoshida, Musashino (JP); Hideo Sado, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 13/084,410

(22) Filed: Apr. 11, 2011

(65) Prior Publication Data

US 2011/0310507 A1 Dec. 22, 2011

(30) Foreign Application Priority Data

Jun. 18, 2010 (JP) ................................. 2010-139827

(51) Int. Cl.
  *G11B 5/02* (2006.01)
  *G11B 21/12* (2006.01)
(52) U.S. Cl. .......................................................... 360/75
(58) Field of Classification Search .................. None
  See application file for complete search history.

(56) References Cited

U.S. PATENT DOCUMENTS

| | | | |
|---|---|---|---|
| 7,002,761 B1 | 2/2006 | Sutardja et al. | |
| 7,193,797 B1 * | 3/2007 | Sun et al. | 360/31 |
| 7,230,786 B1 * | 6/2007 | Ray et al. | 360/75 |
| 7,312,943 B2 * | 12/2007 | Lau et al. | 360/75 |
| 7,333,280 B1 * | 2/2008 | Lifchits et al. | 360/75 |
| 7,382,564 B1 * | 6/2008 | Everett et al. | 360/75 |
| 7,391,584 B1 * | 6/2008 | Sheh et al. | 360/75 |
| 7,411,758 B1 * | 8/2008 | Cheung et al. | 360/75 |
| 7,630,161 B2 | 12/2009 | Nakajima et al. | |
| 7,639,446 B2 | 12/2009 | Mizukoshi et al. | |
| 7,667,911 B2 * | 2/2010 | Lau | 360/75 |
| 7,852,592 B1 * | 12/2010 | Liang et al. | 360/75 |
| 8,023,216 B1 * | 9/2011 | Cheung et al. | 360/75 |
| 2002/0149868 A1 | 10/2002 | Nakasato | |
| 2005/0174672 A1 | 8/2005 | Kim | |

FOREIGN PATENT DOCUMENTS

| | | |
|---|---|---|
| JP | 2002-313038 | 10/2002 |
| JP | 2005-222689 | 8/2005 |
| JP | 2008-034067 | 2/2008 |
| JP | 2008-159223 | 7/2008 |
| JP | 2009-158064 | 7/2009 |

OTHER PUBLICATIONS

JPO, JP Appl. No. 2010-139827 Decision of a Patent Grant, Mailed on Jul. 12, 2011.

* cited by examiner

*Primary Examiner* — Hoa T Nguyen
*Assistant Examiner* — James L Habermehl
(74) *Attorney, Agent, or Firm* — Knobbe Martens Olson & Bear LLP

(57) ABSTRACT

According to one embodiment, a recording device comprises: a recording medium, an arm, a positioning module, a self-servo write clock generator, and an on-track module. The positioning module positions the arm at a position at which the electromagnetic transducer detects a rotational synchronization component of an intermediate pattern comprised in the recording medium. The self-servo write clock generator generates a self-servo write clock based on the detected rotational synchronization component. The on-track module positions the electromagnetic transducer to the intermediate pattern serving as a position for starting self-servo write based on the generated self-servo write clock. Until the on-track module appropriately completes the positioning, the self-servo write clock generator sequentially changes a decoding gate interval corresponding to the intermediate pattern in accordance with the rotational synchronization component, and captures a spiral reproduction waveform.

8 Claims, 12 Drawing Sheets

RECORDING DEVICE AND METHOD FOR POSITIONING ELECTROMAGNETIC TRANSDUCER

CROSS-REFERENCE TO RELATED APPLICATIONS

This application is based upon and claims the benefit of priority from Japanese Patent Application No. 2010-139827, filed Jun. 18, 2010, the entire contents of which are incorporated herein by reference.

FIELD

Embodiments described herein relate generally to a recording device and a method for positioning an electromagnetic transducer.

BACKGROUND

In the field of hard disk drives, so-called spiral servo is widely known. In the spiral servo, multi-spiral patterns are well known as intermediate patterns for self-servo writing on a surface of a magnetic disk. Each of the multi-spiral patterns extends from the innermost circumference to the outermost circumference of a recording area along a spiral line. Such a spiral line has a constant inclination of a specified angle with respect to the circumferential lines across the entire recording area.

In a hard disk drive, a head (electromagnetic transducer) reads magnetic information from the multi-spiral patterns as the magnetic disk is rotated. The head is then positioned in the radius direction of the magnetic disk based on the read magnetic information. The head thus positioned is used in writing servo patterns in servo sectors on the magnetic disk.

A multi-spiral pattern comprises a high frequency area. In the high frequency area, magnetic poles are arranged in an alternating manner along the circumference direction. When the electromagnetic transducer traverses across the high frequency area, a high frequency reproduction signal is output. Sync marks are also formed in the multi-spiral pattern along the circumference direction at a predetermined interval. Each of the sync marks forms a gap between high frequency reproduction signals. The interval between such gaps corresponds to a track width. The sync marks function to position the head for each recording track.

In the spiral servo, the head is positioned based solely on a very small displacement decoded when the head traverses across the multi-spiral patterns. Therefore, before starting writing servo patterns between the spiral patterns, another servo pattern (normal servo pattern that is not the multi-spiral patterns, in other words, an auxiliary servo pattern) must be established between the servo patterns within a limited area on the magnetic disk.

In other words, conventionally, to position the head at a position for starting self-servo write (SSW), seed patterns (auxiliary servo patterns) formed on a part of the magnetic disk are used to position the head at the position for starting the write. A detector of the servo information then decodes the timing of decoding gates to follow a multi-spiral reproduction waveform using the similarity between the repetitive run-outs (RROs) of the auxiliary servo patterns and the multi-spiral patterns. In this manner, by changing the use of the auxiliary servo patterns to the use of the multi-spiral patterns, the head is appropriately positioned (also referred to as on-track) based on the multi-spiral patterns.

However, in the conventional technique, because the servo process must be executed for both of the auxiliary servo patterns and the multi-spiral patterns simultaneously within one sampling cycle, the CPU load and the memory capacity of the servo controller increase.

Furthermore, the area for writing final patterns is reduced by the area of the auxiliary servo patterns, and this issue is not ignorable especially in view of the recent reduction in sampling cycles.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a recording device comprises: a recording medium, an arm, a positioning module, a self-servo write clock generator, and an on-track module. The recording medium comprises an intermediate pattern formed of a multi-spiral pattern for self-servo writing. The recording medium is configured to be driven and rotated. The arm comprises an electromagnetic transducer. The arm is configured to be rotated by a voice coil motor current supplied to a voice coil motor, and configured to position the electromagnetic transducer at a predetermined position on the recording medium. The positioning module is configured to position the arm at a position at which the electromagnetic transducer detects a rotational synchronization component of the intermediate pattern. The self-servo write clock generator is configured to generate a self-servo write clock based on the detected rotational synchronization component. The on-track module is configured to position the electromagnetic transducer to the intermediate pattern serving as a position for starting self-servo write based on the generated self-servo write clock. Until the on-track module appropriately completes the positioning, the self-servo write clock generator sequentially changes a decoding gate interval corresponding to the intermediate pattern in accordance with the rotational synchronization component, and captures a spiral reproduction waveform.

Figure 1:
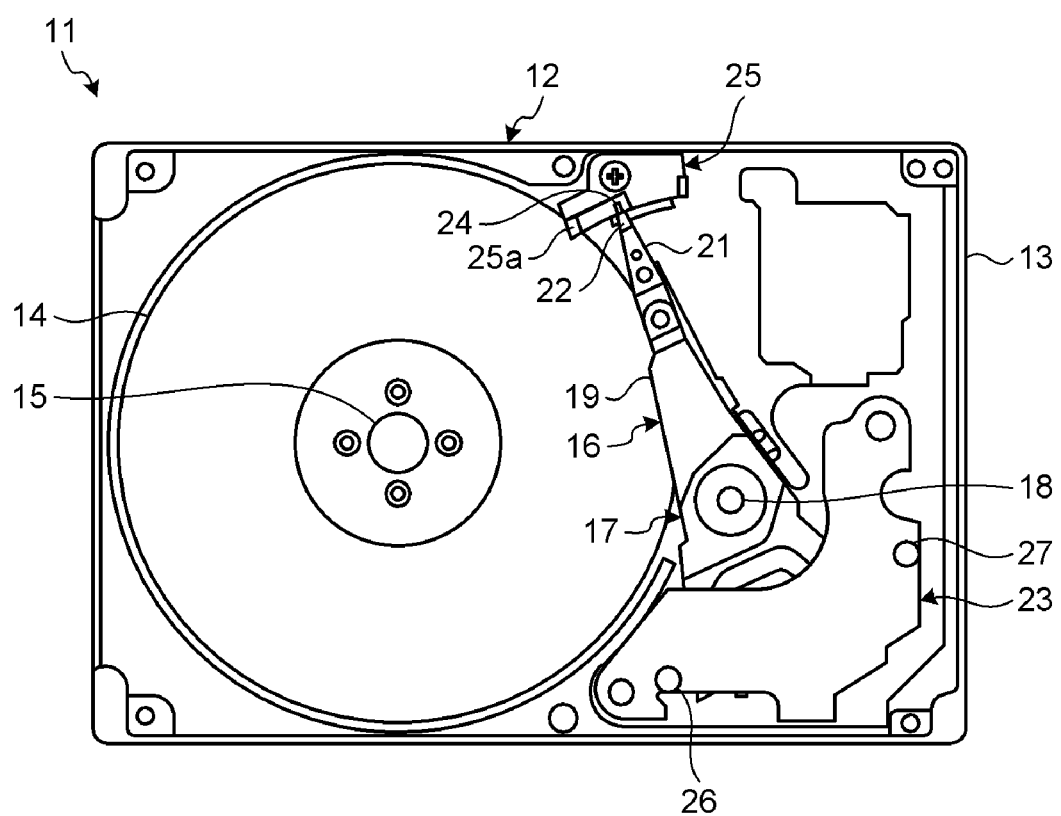
FIG. 1 is an example plan view of an internal configuration of a hard disk drive (HDD) according to an embodiment.

FIG. 1 is a schematic plan view of an internal structure of a hard disk drive (HDD) according to an embodiment.

As illustrated in FIG. 1, a HDD 11 that is an example of a recording device comprises a housing 12. The housing 12 is constituted of a box-shaped base 13 and a cover (not illustrated). The base 13 defines, for example, a flat rectangular parallelepiped internal space, a housing space.

One or more magnetic disk 14, which is an example of a recording medium, is housed in the housing space. The magnetic disk 14 is mounted on a spindle shaft of a spindle motor 15. The spindle motor 15 can rotate the magnetic disk 14 at high speed, such as 5400 round per minutes (rpm), 7200 rpm, 10000 rpm, and 15000 rpm. Each of the magnetic disks 14 is a so-called perpendicular magnetic recording medium, which is to be explained later.

A carriage 16 is also housed in the housing space. The carriage 16 comprises a carriage block 17. The carriage block 17 is rotatably connected to a shaft 18 extending in a vertical direction from the bottom plate of the base 13. A plurality of carriage arms 19 extending from the shaft 18 in a horizontal direction is integrated to the carriage block 17.

A head suspension 21 is attached to an end of each of the carriage arms 19. The head suspension 21 extends out from the end of the carriage arm 19. A flexure is affixed to the head suspension 21. A flying head slider 22 is supported on the flexure. The flexure enables the flying head slider 22 to change its position with respect to the head suspension 21. A head, that is, an electromagnetic transducer 40 (see FIG. 2) is mounted on the flying head slider 22.

Figure 2:
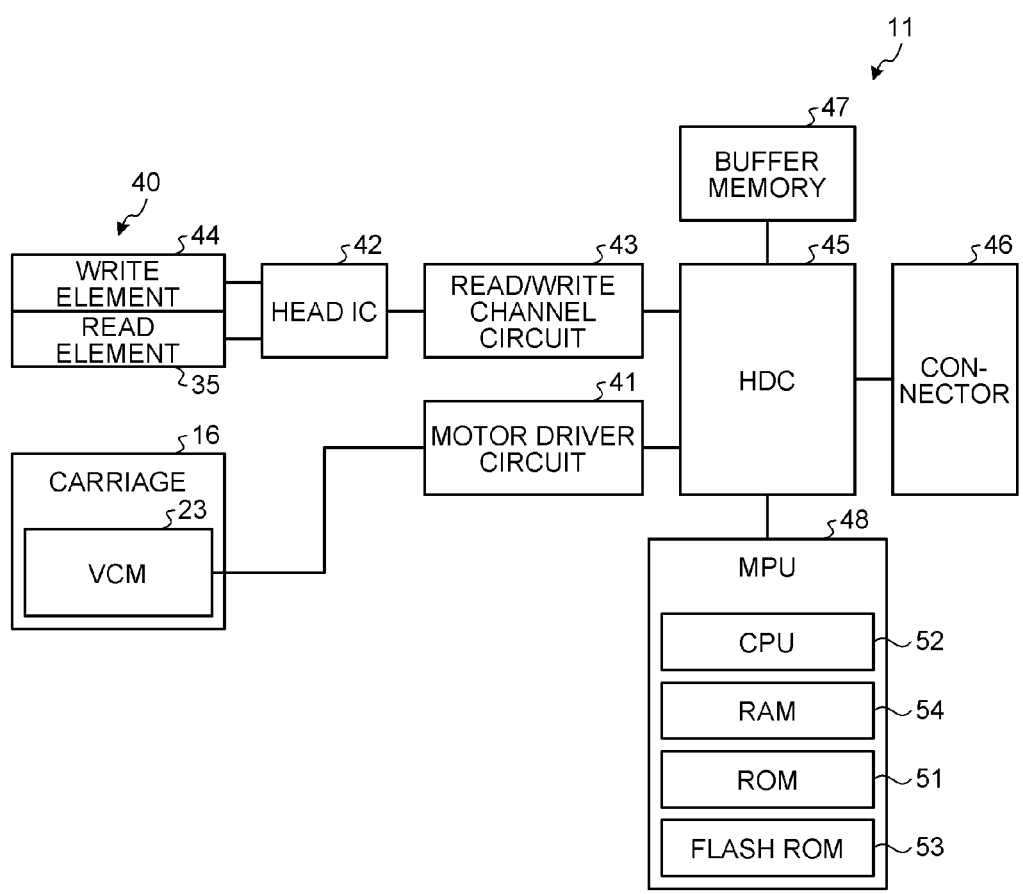
FIG. 2 is an example block diagram of a control system of a tracking servo in the embodiment.

The electromagnetic transducer 40 comprises a write element 44 (see FIG. 2) and a read element 35 (see FIG. 2). A so-called single-pole head is used for the write element 44. The single-pole head is configured to generate a magnetic field by means of a thin-film coil pattern. The magnetic field acts on the magnetic disk 14 in the vertical direction perpendicular to the surface of the magnetic disk 14 due to the main magnetic pole thereof. The write element 44 writes information on the magnetic disk 14 by means of the magnetic field. On the contrary, a giant magnetoresistance (GMR) device or a tunneling magnetoresistance (TMR) device is used for the read element 35. In the GMR device or the TMR device, a resistance change in the spin-valve film or the tunnel junction film is induced depending on the direction of the magnetic field acting from the magnetic disk 14. The read element 35 reads information from the magnetic disk 14 based on such a resistance change.

When flow of air is produced on a surface of the magnetic disk 14 by rotation of the magnetic disk 14, positive pressure, i.e., buoyancy, and negative pressure act on the flying head slider 22 by the action of the air flow. Because the buoyancy, the negative pressure, and a pressing force of the head suspension 21 are in balance, the flying head slider 22 can keep floating with relatively high stiffness while the magnetic disk 14 is under the rotation.

A voice coil motor (VCM) 23 is connected to the carriage block 17. The VCM 23 enables the carriage block 17 to rotate about the shaft 18. The carriage block 17 is rotated to achieve reciprocations of the carriage arm 19 and the head suspension 21. By causing the carriage arm 19 to reciprocate about the shaft 18 while the flying head slider 22 is floating, the flying head slider 22 can move along the radius line of the magnetic disk 14. As a result, the electromagnetic transducer 40 mounted on the flying head slider 22 can traverse across concentric recording tracks between the innermost recording track and the outermost recording track. By way of such a movement of the flying head slider 22, the electromagnetic transducer 40 is positioned to a target recording track.

An outer stopper 26 and an inner stopper 27 arranged on the carriage block 17 limit the movable area of the carriage arm 19 within a range defined thereby.

An end of the head suspension 21 is sectioned into a loading tab 24 extending out therefrom. The carriage arm 19 is reciprocated to allow the loading tab 24 to move in the radius direction of the magnetic disk 14. A ramp member 25 is disposed on a path of the movement of the loading tab 24 outside of the magnetic disk 14. The ramp member 25 is fixed to the base 13. The ramp member 25 receives the loading tab 24.

On the ramp member 25, a ramp 25a is formed to extend along the path of the movement of the loading tab 24. The ramp 25a is ramped in a manner to separate further from a virtual plane including the surface of the magnetic disk 14 as the surface of the ramp 25a extends further away from the rotation axis of the magnetic disk 14. Therefore, when the carriage arm 19 is moved about the shaft 18 away from the rotation axis of the magnetic disk 14, the loading tab 24 is carried up along the ramp 25a. In this manner, the flying head slider 22 is separated from the surface of the magnetic disk 14. The flying head slider 22 is escaped outside of the magnetic disk 14. On the contrary, when the carriage arm 19 is rotated about the shaft 18 toward the rotation axis of the magnetic disk 14, the loading tab 24 is moved down along the ramp 25a. The buoyancy acts from the rotating magnetic disk 14 on the flying head slider 22. The ramp member 25 and the loading tab 24 co-operate to realize a so-called loading and unloading mechanism.

A control system of the HDD 11 will now be explained. FIG. 2 is a schematic block diagram of a control system of a tracking servo. As illustrated in FIG. 2, a motor driver circuit 41 is connected to the VCM 23. The motor driver circuit 41 is configured to supply a driving current to the VCM 23. Depending on the driving current supplied to the VCM 23, the VCM 23 can be displaced by a specified amount. Such an amount of displacement is set based on the amount of rotation (rotation angle) of the carriage block 17.

A read/write channel circuit 43 is connected to a head IC 42. The read/write channel circuit 43 is configured to encode or decode a signal based on a predetermined encoding and decoding scheme. An encoded signal, that is, a write signal is supplied to the head IC 42. The head IC 42 amplifies the write signal. The amplified write signal is supplied to the write element 44. A read signal output from the read element 35 is amplified by the head IC 42, and supplied to the read/write channel circuit 43. The read/write channel circuit 43 decodes the read signal.

A hard disk controller (HDC) 45 is connected to the motor driver circuit 41 and the read/write channel circuit 43. The HDC 45 is configured to supply a control signal to the motor driver circuit 41. The control signal controls the output of the motor driver circuit 41, that is, the driving current. Similarly, the HDC 45 sends a write signal to be encoded to the read/write channel circuit 43, and receives a decoded read signal from the read/write channel circuit 43. The HDC 45 may generate a write signal to be encoded based on data received from a host computer, for example. Such data may be passed to the HDC 45 via a connector 46. A control signal cable and a power cable (none of which is illustrated) extending from the main board of the host computer, for example, may be connected to the connector 46. Similarly, the HDC reproduces data from the decoded read signal. The HDC 45 may output the reproduced data to the host computer via the connector 46. In such transmissions and receptions of the data, the HDC 45 may use a buffer memory 47, for example. The buffer memory 47 temporarily stores therein the data. A synchronous dynamic random access memory (SDRAM), for example, may be used as the buffer memory 47.

A microprocessor unit (NPU) 48 is connected to the HDC 45. The MPU 48 comprises a central processing unit (CPU) 52 caused to operate based on computer programs stored in a read-only memory (ROM) 51, for example. Such computer programs comprise a computer program for positioning the electromagnetic transducer 40 according to the embodiment. The computer program for positioning the electromagnetic transducer 40 may be made available as so-called firmware. The CPU 52 may obtain data from a flash ROM 53, for example, upon realizing operations thereof. Such computer programs and data may be stored temporarily in a random access memory (RAM) 54. The ROM 51, the flash ROM 53, and the RAM 54 may be connected to the CPU 52 directly.

Figure 3:
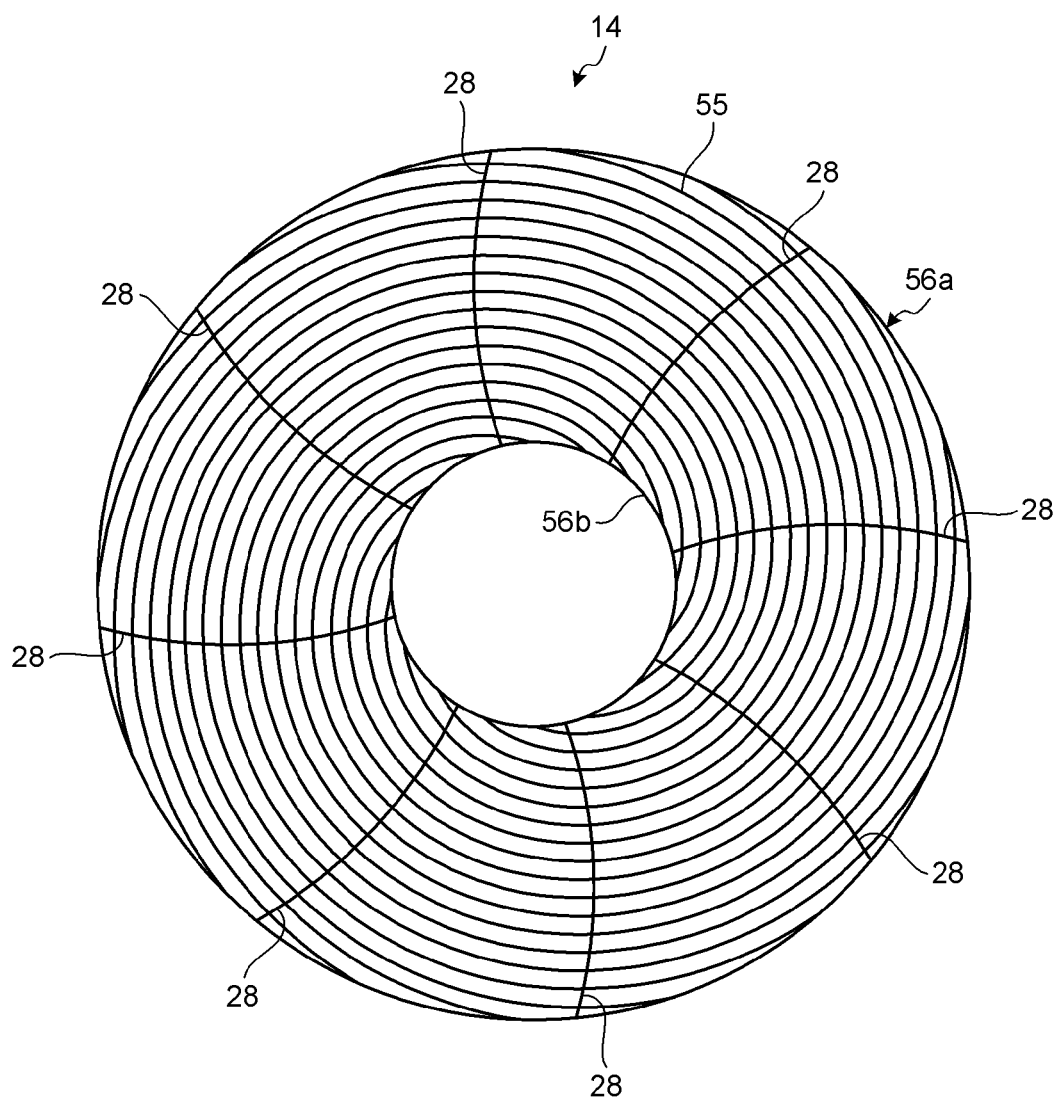
FIG. 3 is an example plan view of a magnetic disk illustrating multi-spiral patterns in the embodiment.

The magnetic disk 14 will now be explained. FIG. 3 is a plan view of a magnetic disk for illustrating the concept of multi-spiral patterns, and FIG. 4 is a partially enlarged schematic plan view of the surface structure of the magnetic disk.

Figure 4:
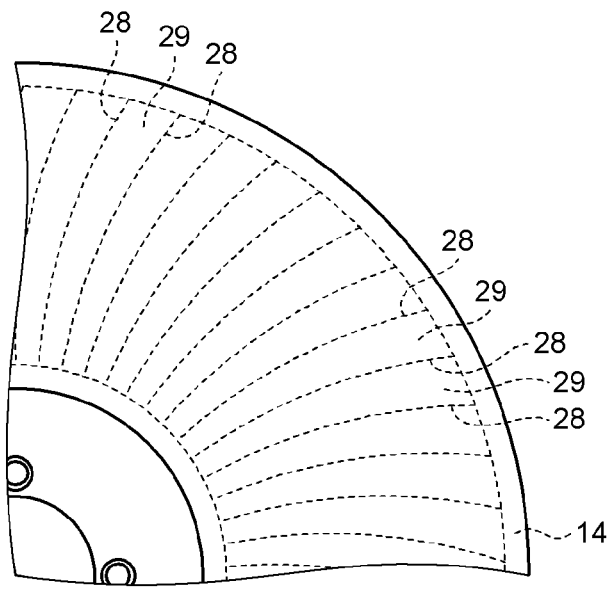
FIG. 4 is an example partially enlarged plan view of a surface structure of the magnetic disk in the embodiment.

As illustrated in FIGS. 3 and 4, a plurality of (for example, 200) servo sector areas 28, each of which is curving and extending in the radius direction of the magnetic disk 14, is arranged on the front and the rear surfaces of the magnetic disk 14. The servo sector areas 28 are arranged equally spaced in the circumference direction. Servo patterns are established in the servo sector areas 28. The electromagnetic transducer 40 arranged on the flying head slider 22 reads magnetic information written in the servo patterns. Based on the information read from the servo patterns, the flying head slider 22 is positioned in the radius direction of the magnetic disk 14. A circular recording track is formed at a position where the flying head slider 22 is positioned. Concentric recording tracks are established as the flying head slider 22 is displaced in the radius direction. The curvature of the servo sector area 28 is set so as to follow the path of the movement of the electromagnetic transducer 40.

Data areas 29 are reserved between the adjacent servo sector areas 28 in the circumference direction. The electromagnetic transducer 40 follows a recording track in the data area 29 at a point positioned by using the servo patterns. The write element 44 in the electromagnetic transducer 40 writes magnetic information following the recording track. The read element 35 in the electromagnetic transducer 40 reads magnetic information following the recording track.

Figure 5:
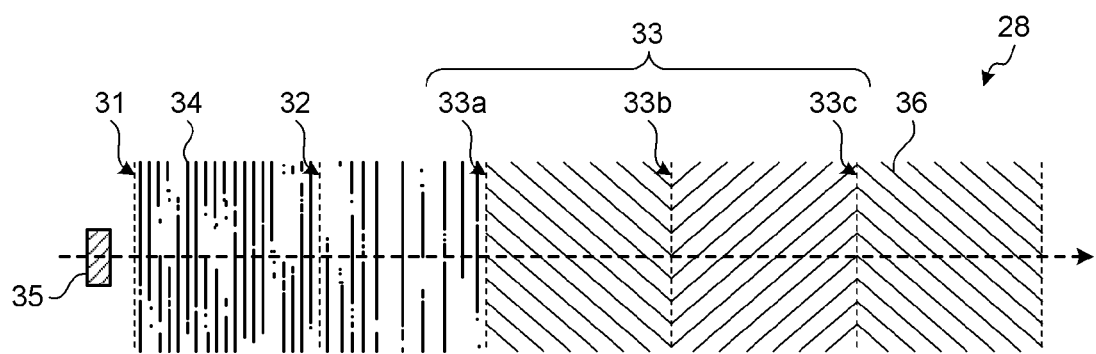
FIG. 5 is an example partial enlarged plan view of a structure of a servo sector area in the embodiment.

FIG. 5 is a partially enlarged plan view of a structure of a servo sector area. As illustrated in FIG. 5, each of the servo sector areas 28 is sectioned into a preamble field 31, a servo mark address field 32, and a phase burst field 33, sequentially from upstream thereof. In the preamble field 31, a plurality of magnetized patterns 34 extending in the radius direction of the magnetic disk 14, for example, is established. The magnetized patterns 34 are arranged equally spaced to each other along the circumference direction of the magnetic disk 14. The preamble field 31 functions to ensure the synchronization of a signal read by the read element 35, as well as to adjust a gain based on the signal read by the read element 35. The terms "upstream" and "downstream" used herein are defined with respect to the running direction of the flying head slider 22 defined by the rotating magnetic disk 14.

In the servo mark address field 32, magnetic poles, which are N poles and S poles, are arranged in a specific pattern. The arrangement of the magnetic poles reflects a sector number and a track number. In the servo mark address field 32, another set of magnetized patterns extending in the radius direction of the magnetic disk 14 is established. These magnetized patterns identify a servo clock signal. The servo clock signal enables a phase, which is to be described later, to be identified. The servo mark address field 32 functions to identify a sector number and a track number. At the same time, the preamble field 31 and the servo mark address field 32 function to allow reference timing to be determined for the phase.

In the phase burst field 33, a plurality of magnetized patterns, that is, phase burst lines 36 extending at a predetermined inclination angle with respect to the radius lines of the magnetic disk 14 is established. When the phase burst lines 36 are established, an even field 33a and an odd field 33b are arranged in an alternating manner in the phase burst field 33. The even field 33a and the odd field 33b are used in pair. In the even field 33a, when the read element 35 traversing across the phase burst lines 36 is displaced toward the inner circumference of the magnetic disk 14, the phase is delayed. On the contrary, in the odd field 33b, when the read element 35 traversing across the phase burst lines 36 is displaced toward the outer circumference of the magnetic disk 14, the phase is shifted forward.

With such a structure, in the HDD 11, during the tracking servo control, as the read element 35 traverses across the preamble field 31, the servo mark address field 32, and the phase burst field 33 one by one, the read element 35 outputs signals. The HDC 45 generates a servo clock signal when the read element 35 traverses across the servo mark address field 32. When the read element 35 traverses across the phase burst field 33, the HDC 45 collects a signal waveform for each of the even field 33a and the odd field 33b. The HDC 45 then averages out the signal waveforms using the fast Fourier transform. The HDC 45 then calculates, for each of the even field 33a and the odd field 33b, a phase difference from the servo clock signal and the signal waveform. The HDC 45 outputs a positioning error signal based on the phase difference thus calculated. The positioning error signal is supplied to the VCM 23 as a control signal. As a result, the electromagnetic transducer 40 can follow a target recording track reliably. Alternatively, a so-called amplitude burst field may replace the phase burst field 33, provided that the amplitude decoding scheme is to be used.

A method for establishing the servo sector areas 28 in the magnetic disk 14 will now be explained. Multi-spiral patterns 55, which are the intermediate patterns for self-servo writing, are written in the magnetic disk 14 in which such intermediate patterns for self-servo writing are not written yet. A servo track writer (STW) is used in writing the multi-spiral patterns 55. The magnetic disk 14 is mounted on the STW. The STW rotates the magnetic disk 14 at a constant rotation speed. At the same time, the STW moves the write device in the radius direction at a constant speed. The write device may be mounted on a given flying head slider, and the flying head slider may be moved along the radius line of the magnetic disk 14, for example. The magnetic field of the write device acts onto the magnetic disk 14.

As illustrated in FIG. 3, the multi-spiral patterns 55 are arranged equally spaced to each other in the circumference direction. The number of the multi-spiral patterns 55 is set to twice the number of the servo sector areas 28. In other words, two of the multi-spiral patterns 55 are allocated to each of the servo sector areas 28. Alternatively, three or more of the multi-spiral patterns may be allocated to each of the servo sector areas 28. Even in such an allocation, the multi-spiral patterns should be arranged equally spaced to each other in the circumference direction. In FIG. 3, some of the servo sector areas 28 and the multi-spiral patterns 55 are omitted for convenience.

Figure 6:
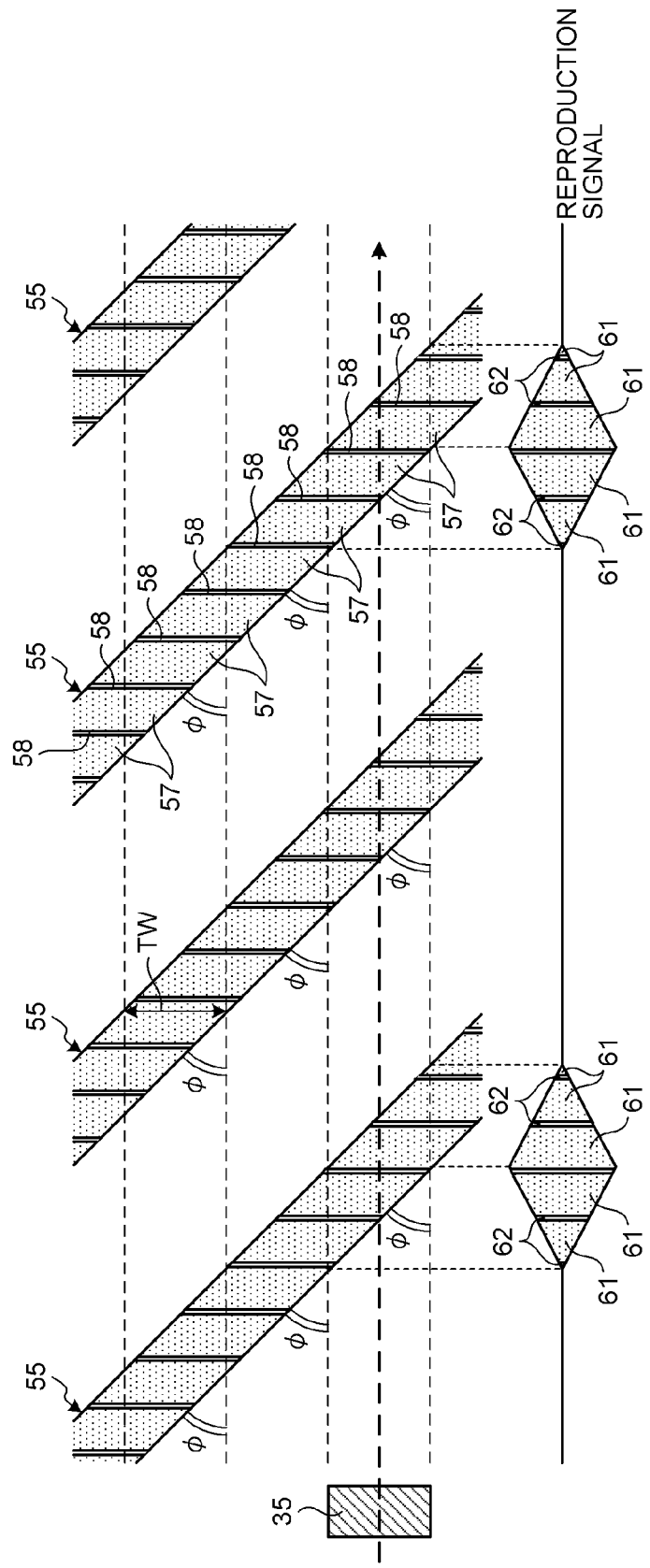
FIG. 6 is an example partially enlarged plan view of details of the multi-spiral patterns and a reproduction signal based on the multi-spiral patterns in the embodiment.

Each of the multi-spiral patterns 55 is laid along a spiral line extending from an outermost circumference 56a to an innermost circumference 56b of the recording area. The recording area corresponds to the maximum area in which the write element 44 can write magnetic information. The spiral lines maintain a specified inclination angle $\phi$ with respect to the circumferential lines, as illustrated in FIG. 6, across the entire recording area.

Each of the multi-spiral patterns 55 forms the array of areas to be magnetized along the spiral line. N poles and S poles are arranged in an alternating manner in the circumference direction. Such an arrangement establishes high frequency fields 57. The length of the areas to be magnetized in the radius direction is set to the length equal to the width TW of the recording track. The length in the radius direction is measured on the radius line of the magnetic disk 14. Upon establishing the high frequency fields 57, a high frequency write signal is supplied to the write device following a predetermined write clock.

In the multi-spiral pattern 55, sync marks 58 are formed at a specified interval in the circumference direction. The sync marks 58 are formed to have only one magnetic pole, for example. Upon establishing the sync marks 58, a constant write signal is supplied to the write device. The write signal is kept constant over a specified number of pulses of the write clock. In this manner, the high frequency is stopped.

When the read element 35 traverses across the high frequency field 57, the read element 35 outputs a high frequency reproduction signal 61. The amplitude of the reproduction signal 61 gradually increases as the read element 35 is moved onto the multi-spiral pattern 55. When the read element 35 traverses across the multi-spiral pattern 55 at the track width TW, the reproduction signal 61 indicates the highest amplitude. The amplitude of the reproduction signal 61 then gradually decreases. The sync mark 58 forms a gap 62 between the high frequency reproduction signals 61. The gap 62 separates the high frequency reproduction signals 61. The interval between the sync marks 58 may be set optionally. However, the noise can be minimized by optimizing the positioning of the gap 62 in the reproduction signals reproduced by the read element 35. The interval between the sync marks 58 does not necessarily have to determine the track pitch. The sync marks 58 are arranged equally spaced to each other in the circumference direction. While the read element 35 traverses across one of the multi-spiral patterns 53, the read element 35 traverses across at least two of the sync marks 58.

After the writing of the multi-spiral patterns 55 is completed, the magnetic disk 14 is removed from the STW.

The magnetic disk 14 written with the multi-spiral patterns 55 is incorporated into the HUD 11. In each of the HDDs 11, the electromagnetic transducer 40 is positioned at a position for starting self-servo writing (SSW), and the servo sector areas 28 are magnetized based on the written multi-spiral patterns 55. Upon performing the write, the CPU 52 executes the computer program for positioning the electromagnetic transducer 40 according to the embodiment. At this time, the CPU 52 executes the positioning program to function as a device for positioning the electromagnetic transducer 40.

Figure 7:
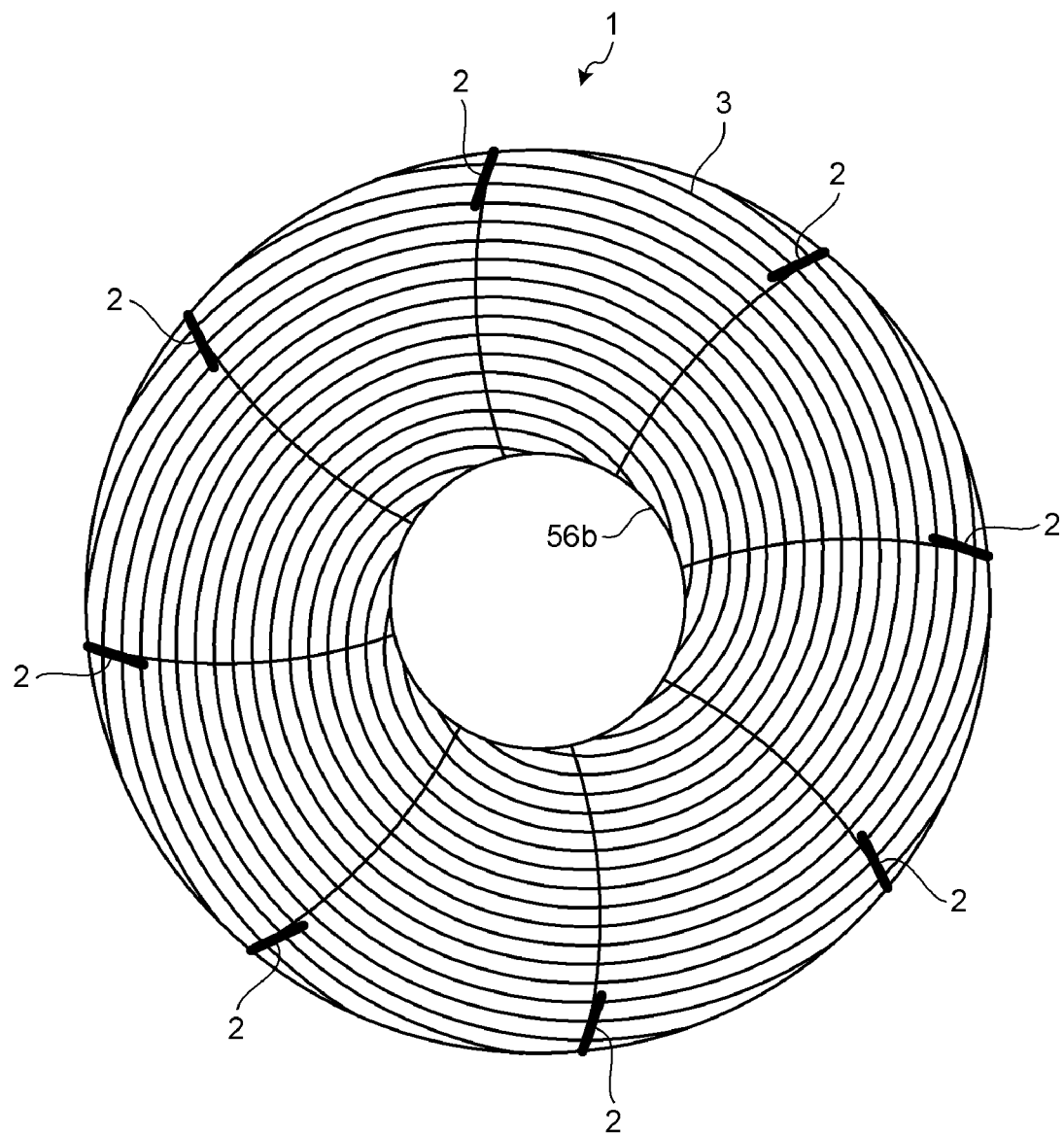
FIG. 7 is an example plan view of a conventional magnetic disk with seed patterns.

As illustrated in FIG. 7, in a conventional example, to position the head at the position for starting the SSW, the head is at first positioned with respect to seed patterns 2, which are auxiliary servo patterns formed on a part of a magnetic disk 1, and the similarity between the repetitive run-outs (RROs) of the seed patterns 2 and of multi-spiral patterns 3 is used to match the timing of the decoding gates with the multi-spiral reproduction waveform for decoding. In this manner, in the technique adopted in the conventional example, the on-track target patterns are changed from the seed patterns 2 to the multi-spiral patterns 3.

Figure 8:
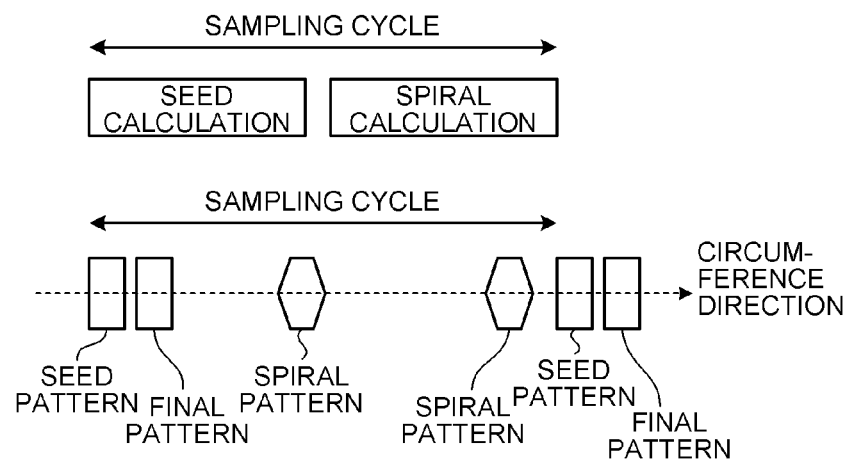
FIG. 8 is an example schematic diagram of a conventional reproduction waveform in one sampling cycle.

However, with this technique, the servo process must be executed for both of the seed patterns 2 and the multi-spiral patterns 3 simultaneously within one sampling cycle as illustrated in FIG. 8. Therefore, the CPU load and the memory capacity of the servo controller increase disadvantageously.

As can be seen in the reproduction waveform illustrated in FIG. 8, the area for writing the final patterns is reduced by the area of the seed patterns 2, and this issue is not ignorable especially in view of the recent reduction in sampling cycles.

Thus, in the HDD 11 according to the embodiment, the seed patterns, which are the auxiliary servo patterns, are eliminated, and the magnetic disk 14 having the multi-spiral patterns 55 alone is used to position the head at the position for starting the SSW.

Figure 9:
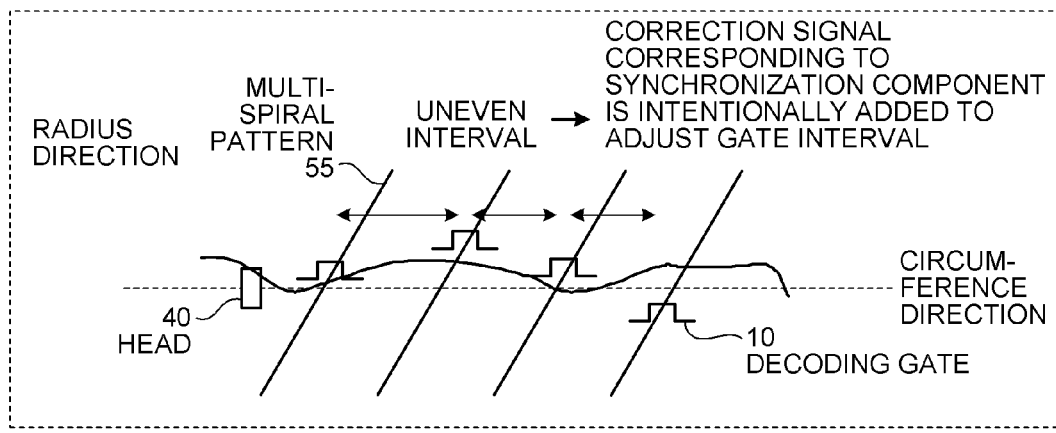
FIG. 9 is an example schematic diagram illustrating a principle of a decoding gate timing control in the embodiment.

A basic principle will now be explained with reference to FIG. 9, comparing with a conventional technique (see FIG. 10).

Figure 10:
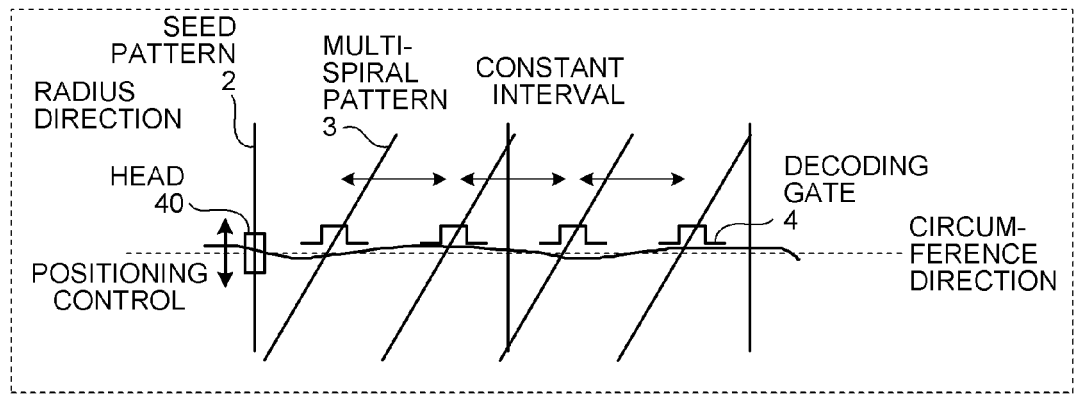
FIG. 10 is an example schematic diagram illustrating a principle of a conventional decoding gate timing control.

As illustrated in FIG. 10, conventionally, upon decoding the multi-spiral patterns 3, the head is positioned precisely in the radius direction using the seed patterns 2, and the waveform reproduced thereby from the multi-spiral patterns 3 is controlled to be approximately equally spaced. In this manner, the timing of decoding gates 4 can easily be matched to tae spiral patterns 3. On the contrary, in the HDD 11 according to the embodiment, because the magnetic disk 14 does not have any seed patterns, an appropriate VCM current is supplied to fix the head approximately to the position of the inner stopper 27. At this time, although the intervals between the waveforms reproduced from the multi-spiral patterns 55 are uneven as illustrated in FIG. 9, by taking advantage of the fact that the RRO components are dominant, the timing of decoding gates 10 for taking out decoding signals is variably controlled using a specific synchronization component (e.g., a primary component), whereby the timing of the decoding gates 10 is matched to the multi-spiral patterns 55.

A process of positioning the electromagnetic transducer 40, the process being realized by the CPU 52 executing the positioning program based on such a basic principle, will now be explained.

Figure 11:
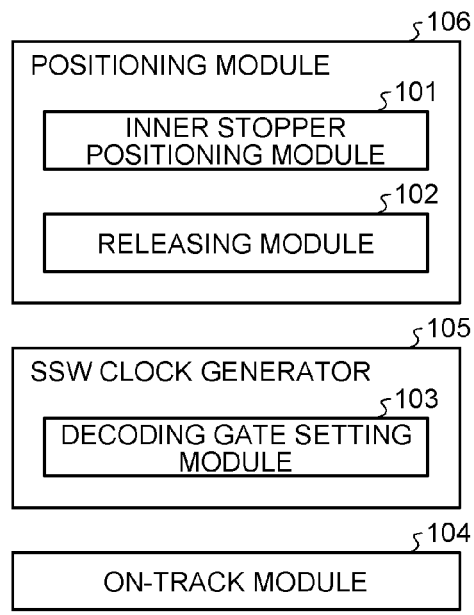
FIG. 11 is an example functional block diagram of a configuration for realizing a process of positioning an electromagnetic transducer in the embodiment.

FIG. 11 is a block diagram of functions for the process of positioning the electromagnetic transducer 40. In the HDD 11 according to the embodiment, because the RROs have a large impact, during the process of positioning the electromagnetic transducer 40, an SSW clock control and a servo locking control are performed repeatedly is a trial-and-error approach while sequentially changing the timing of the decoding gates, so that more appropriate timing can be learned.

As illustrated in FIG. 11, the CPU 52 follows the positioning program to provide an on-track module 104, an SSW clock generator 105, and a positioning module 106.

The positioning module 106 is for bringing the carriage arm 19 to a position allowing the electromagnetic transducer 40 to detect a rotational synchronization component of the multi-spiral patterns 55, and comprises an inner stopper positioning module 101 and a releasing module 102.

The inner stopper positioning module 101 is configured to supply an appropriate current to the VCM 23 to move the electromagnetic transducer 40 toward the inner side, and fixes the electromagnetic transducer 40 approximately to the position of the inner stopper 27. The releasing module 102 is configured to reduce the VCM current subtly and gradually, so that the electromagnetic transducer 40 is shifted from the position of the inner stopper 27, at which the electromagnetic transducer 40 has been fixed by the inner stopper positioning module 101, to a released state, so that the rotational synchronization component will become detectable.

Figure 12A:
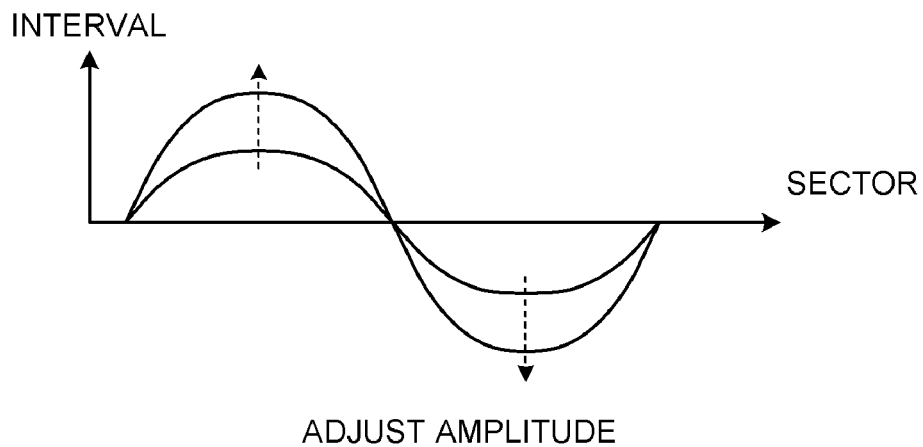
FIG. 12 is an example schematic diagram of correction signals for changing the timing of the decoding gates in the embodiment.
Figure 12B:
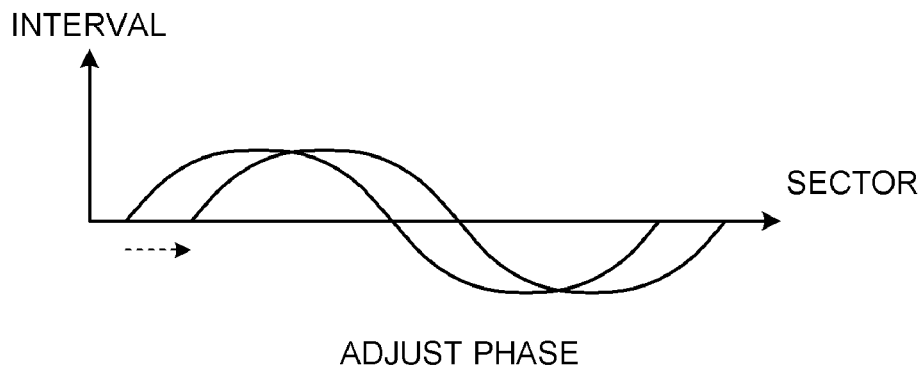
Figure 12C:
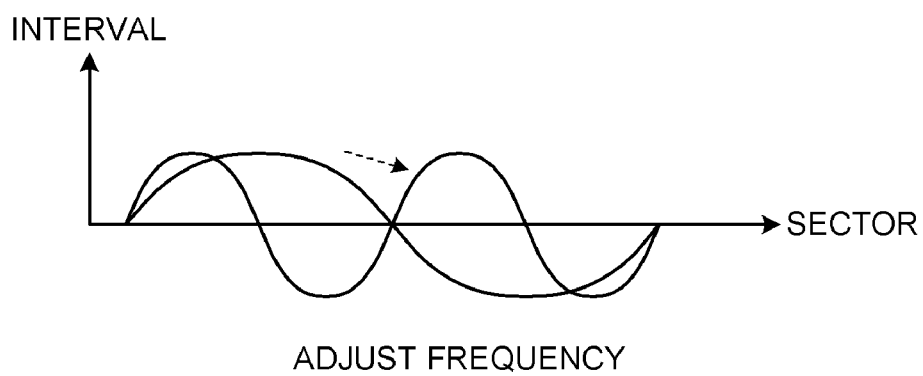

The SSW clock generator 105 generates an SSW clock, and moves the electromagnetic transducer 40 to the position for starting the SSW. As illustrated in FIG. 11, the SSW clock generator 105 comprises a decoding gate setting module 103. The decoding gate setting module 103 is configured to adjust the gate interval by adding a correction signal corresponding to a certain disk rotational synchronization component to the timing of the decoding gates 10, so that the timing of the decoding gates 10 will be matched to the multi-spiral patterns 55. As illustrated in FIGS. 12A to 12C, the correction signal comprises the amplitude, the phase, and the frequency.

The on-track module 104 is configured to set a target position where the electromagnetic transducer 40 is kept "on track" to a position relatively nearer to the outer side of the magnetic disk 14 (being "on track" herein means intersecting with the multi-spiral patterns, not tracing a track), and locks the servo.

A process performed by the decoding gate setting module 103, the on-track module 104, and the SSW clock generator 105 will now be explained with reference to the flowcharts illustrated in FIGS. 13 to 15.

Figure 13:
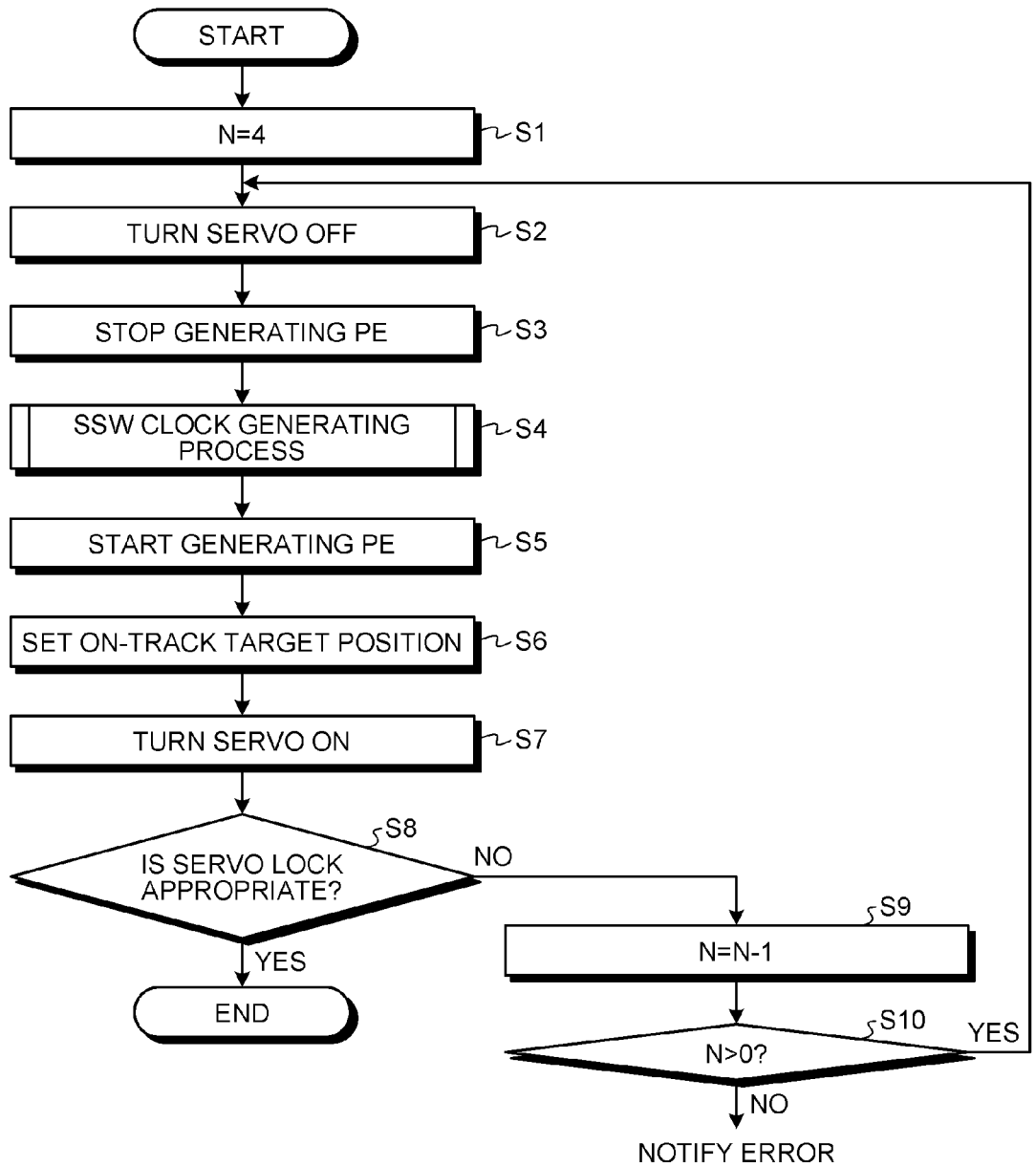
FIG. 13 is an example flowchart of positioning process at a position for starting self-servo writing (SSW) in the embodiment.

As illustrated in FIG. 13, the CPU 52 at first sets an initial value to the number of repetitions N (S1). For example, the CPU 52 sets four to the number of repetitions N (N=4).

The CPU 52 then turns off the servo for positioning the electromagnetic transducer 40 (S2), stops generating a position error (PE) (S3), and performs an SSW clock generating process (S4).

The SSW clock generating process performed at S4 will now be explained. As illustrated in FIG. 14, the CPU 52 sets an initial value to the number of repetitions M (S11). For example, the CPU 52 sets four to the number of repetitions M (M=4).

The CPU 52 then turns a phase locked loop (PLL) off (S12), and executes a decoding gate controlling process (S13).

The decoding gate controlling process performed at S13 will now be explained. As illustrated in FIG. 15, the CPU 52 sets an initial value to the number of repetitions L (S21). For example, the CPU 52 sets ten to the number of repetitions L (L=10).

The CPU 52 then sets an initial value to the number of repetitions K (S22). For example, the CPU 52 sets eight to the number of repetitions K (K=8).

After setting the number of repetitions K, the CPU 52 turns the decoding gate off and on (S23 and S24), and determines if the timing of the decoding gates is appropriate (S25). More specifically, the CPU 52 determines if the timing of the decoding gates is appropriate based on the probability of the sync marks being detected from the multi-spiral patterns 55.

If the CPU 52 determines that the timing of the decoding gate does not match the spiral reproduction waveform (No at S25), the system control returns to S23 and the CPU 52 turns the decoding gate off and on again, provided that the number of repetitions is equal to or less than K (S26 and Yes at S27).

On the contrary, when the number of repetitions exceeds K (S26 and No at S27), the CPU 52 performs a parameter updating process (S28). In the parameter updating process at S28, specifically, the CPU 52 adjusts the gate interval by adding a correction signal corresponding to a certain disk rotational synchronization component to the timing of the decoding gates (the decoding gate setting sub-module 103).

After correcting the timing of the decoding gate, the CPU 52 returns to S22 provided that the number of repetitions is equal to or less than L (S29 and Yes at S30), and retries the decoding gate on-off operation within the range not exceeding the preset number K.

When the number of repetitions exceeds L (S29 and No at S30), the CPU 52 notifies an error and ends the process.

If the CPU 52 determines that the timing of the decoding gates matches to the spiral reproduction waveform (Yes at S25), the CPU 52 ends the decoding gate controlling process at S13, turns the PLL on (S14), and determines if the PLL can be locked by comparing a PLL control error to an appropriate threshold (S15).

If the CPU 52 determines that the PLL lock is abnormal (No at S15), the CPU 52 executes a parameter updating process (S16). Specifically, in the parameter updating process at S16, the CPU 52 adjusts the gate interval by adding a correction signal corresponding to a certain disk rotational synchronization component to the timing of the decoding gates (the decoding gate setting sub-module 103).

Figure 14:
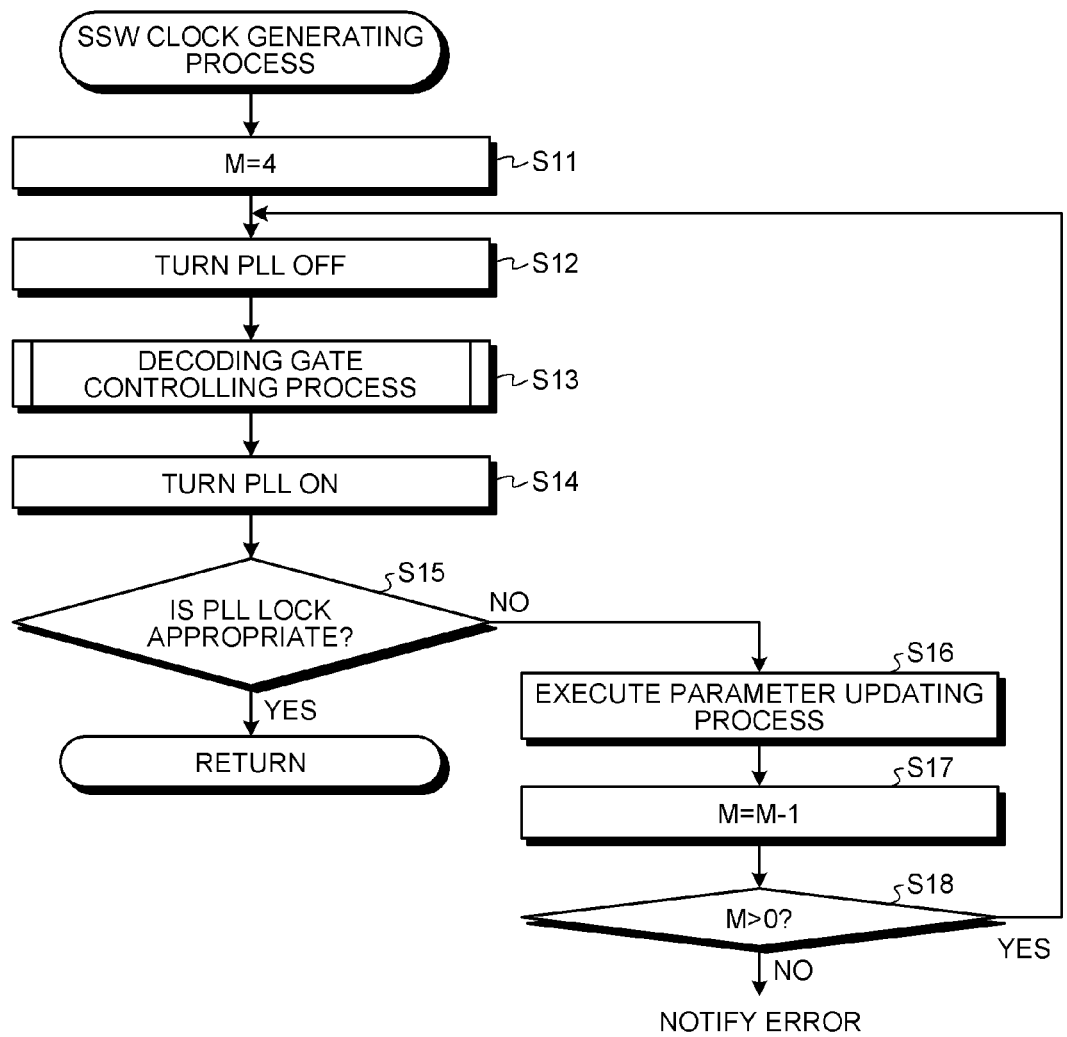
FIG. 14 is an example flowchart of a self-servo write (SSW) clock signal generating process in the embodiment.
Figure 15:
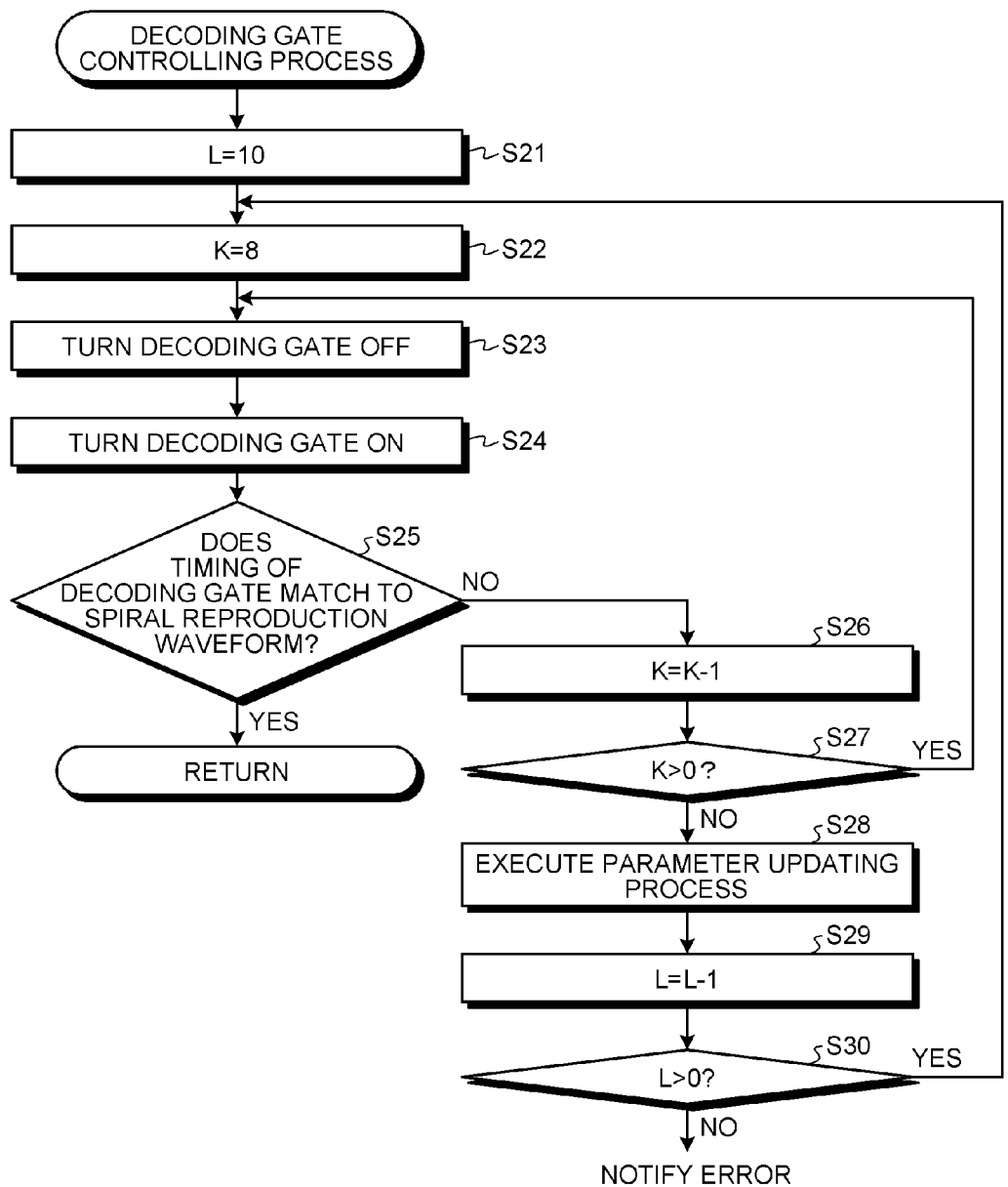
FIG. 15 is an example flowchart of a decoding gate controlling process in the embodiment.

The parameter updating process (S16) illustrated in FIG. 14 and the parameter updating process (S28) illustrated in FIG. 15 are a process for calculating an amount y by which the timing of the decoding gates is corrected based on the primary synchronization component of the magnetic disk 14, and more specifically, expressed by the following equations:

$$y = A \sin(2\pi i/Ns + \phi)$$

$$A = A0 \text{ (initial value)}$$

$$A = A + \Delta A \text{ (in the parameter updating process)}$$

where i is a sector number,

Ns is the number of sectors, $\phi$ is the initial phase (an appropriate value is preset), A0 is the initial amplitude (an appropriate value, e.g., zero, is preset), and $\Delta A$ is the amount of amplitude correction (an appropriate value is preset).

After correcting the timing of the decoding gates in the manner described above, the CPU 52 returns to S12 provided that the number of repetitions is equal to or less than M (S17 and Yes at S18), and repeats the process. In other words, the CPU 52 corrects the timing of the decoding gates, and keeps trying to lock the PLL as long as the number of repetitions is less than the predetermined number M.

If the number of repetitions exceeds M (S17 and No at S18), the CPU 52 notifies an error and ends the process.

If the CPU 52 determines that the PLL lock is not abnormal (Yes at S15), the CPU 52 ends the SSW clock generating process at S4.

When the SSW clock generating process is completed, the CPU 52 starts generating the PE (S5), and sets the target position at which the electromagnetic transducer 40 is to be kept "on track" to a position relatively nearer to the outer side (S6 performed by the on-track module 104).

The target position setting process performed at S6 can be expressed in the following equation based on PE0 that is the smallest value of the PE generated at S5 (provided that the negative polarity is at the outer side):

$$Pt=PE0-\Delta P$$

where, ΔP is a positive value selected appropriately.

After setting the target position at which the electromagnetic transducer 40 is to be kept "on track", the CPU 52 turns on the servo for positioning the electromagnetic transducer 40 (S7 performed by the on-track module 104).

After turning on the servo, the CPU 52 determines if the servo lock is appropriate (S8). If the CPU 52 determines that the servo lock is abnormal (No at S8), the CPU 52 returns to S2 provided that the number of repetitions is equal to or less than N (S9 and Yes at S10), and repeats the process.

If the number of repetitions exceeds N (S9 and No at S10), the CPU 52 notifies an error, and ends the process.

If the CPU 52 determines that the servo lock is not abnormal (Yes at S8), the CPU 52 ends the process.

In this manner, in the HDD 11 according to the embodiment, upon performing the SSW, the electromagnetic transducer 40 can be brought "on track" with respect to the multi-spiral patterns 55 by repeating the SSW clock control and the servo lock in a trial-and-error approach while sequentially changing the timing of the decoding gates.

In the manner described above, with the HDD 11 according to the embodiment, the seed patterns, which are the auxiliary servo patterns (the patterns used only for positioning the head at a position for starting the SSW) used conventionally in positioning the head to the intermediate patterns for the SSW, e.g., multi-spiral patterns, can be eliminated. Therefore, the time during which the STW is used and the CPU load of the SSW controller can be reduced, the memory capacity of the SSW controller can be saved, and the area for writing the final patterns can be increased advantageously.

In the parameter updating process (S16) illustrated in FIG. 14 and the parameter updating process (S28) illustrated in FIG. 15, when the on-track module 104 enables the electromagnetic transducer 40 to be positioned "on track" appropriately with respect to the multi-spiral patterns 55 serving as the position for starting the SSW, the decoding gate setting module 103 can store therein the correction value used in positioning the electromagnetic transducer 40 "on track" appropriately, and use the correction value thus stored as the initial value used in allowing the decoding gate setting module 103 to adjust the decoding gate interval when another attempt is to be made to position the electromagnetic transducer 40 "on track" when the SSW is ended abnormally. In this manner, because the repetitive processes can be omitted, the time required for the SSW can be reduced.

The computer programs executed in the HDD 11 according to the embodiment may be provided in a manner recorded in a computer-readable recording medium, such as a compact disk read-only memory (CD-ROM), a flexible disk (FD), a compact disk recordable (CD-R), and a digital versatile disk (DVD), as a file in an installable or an executable format.

The computer programs executed in the HDD 11 according to the embodiment may be provided in a manner stored in a computer connected to a network such as the Internet to be made available for downloads via the network. Furthermore, the computer programs executed in the HDD 11 according to the embodiment may be provided or distributed over a network such as the Internet.

The computer programs executed in the HDD 11 according to the embodiment has a modular structure comprising each of the modules explained above (the inner stopper positioning module 101, the releasing module 102, the on-track module 104, and the SSW clock generator 105). In the actual hardware, by causing the CPU (processor) to read the computer programs from the ROM and to execute the same, each of the modules is loaded to the main memory, and the inner stopper positioning module 101, the releasing module 102, the on-track module 104, and the SSW clock generator 105 are provided on the main memory.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recording device comprising:
a recording medium comprising an intermediate pattern for self-servo writing, wherein the recording medium is configured to be driven and rotated, and wherein the intermediate pattern is configured as a multi-spiral pattern;
an arm comprising an electromagnetic transducer, wherein the arm is configured to be rotated by a voice coil motor current supplied to a voice coil motor and wherein the arm is configured to position the electromagnetic transducer at a predetermined position on the recording medium;
a positioning module configured to position the arm at a location at which the electromagnetic transducer detects a rotational synchronization component of the intermediate pattern;
a self-servo write clock generator configured to generate a self-servo write clock based on the detected rotational synchronization component; and
an on-track module configured to position the electromagnetic transducer at a self-servo write start location on the intermediate pattern, wherein the self-servo write start location serves as a position for starting self-servo write based on the generated self-servo write clock,
wherein, until the on-track module completes the positioning, the self-servo write clock generator is further configured to:
sequentially change a decoding gate interval corresponding to the intermediate pattern in accordance with the rotational synchronization component, and
capture a spiral reproduction waveform,
wherein the self-servo write clock generator comprises a decoding gate setting module configured to sequentially adjust the decoding gate interval corresponding to the intermediate pattern based on a correction value associated with the rotational synchronization component, and wherein the decoding gate setting module is further configured to use a sine wave function of a lower-order rotational synchronization component as the correction value.

2. The recording device of claim 1, wherein the decoding gate setting module is further configured to use one of amplitude, phase, and frequency of the sine wave function as a parameter.

3. The recording device of claim 1, wherein the decoding gate setting module comprises a storage module configured to store the correction value, and wherein the decoding gate setting module is further configured to use the correction value stored in the storage module as an initial value in adjusting the decoding gate interval when the on-track module changes the position of the electromagnetic transducer on the intermediate pattern in response to the self-servo write ending abnormally.

4. The recording device of claim 1, wherein the positioning module comprises:
   an inner stopper positioning module configured to move the arm toward an inner side of the recording medium and to position the electromagnetic transducer at an inner stopper; and
   a releasing module configured to release the electromagnetic transducer from the position of the inner stopper enabling the electromagnetic transducer to detect the rotational synchronization component.

5. A method for positioning an electromagnetic transducer executed by a recording device comprising a recording medium and an arm, wherein the recording medium comprises an intermediate pattern configured as a multi-spiral pattern for self-servo writing, wherein the arm is capable of being rotated by a voice coil motor current supplied to a voice coil motor and wherein the arm is capable of positioning the electromagnetic transducer at a predetermined position on the recording medium, the method comprising:
   positioning the arm at a location at which the electromagnetic transducer detects a rotational synchronization component of the intermediate pattern;
   generating a self-servo write clock based on the detected rotational synchronization component;
   positioning the electromagnetic transducer at a location on the intermediate pattern serving as a position for starting self-servo write based on the generated self-servo write clock; and
   until the positioning is completed, sequentially changing a decoding gate interval corresponding to the intermediate pattern in accordance with the rotational synchronization component, and capturing a spiral reproduction waveform,
   wherein generating a self-servo write clock based on the detected rotational synchronization component comprises sequentially adjusting the decoding gate interval corresponding to the intermediate pattern based on a correction value associated with the rotational synchronization component, and
   wherein sequentially adjusting the decoding gate interval further comprises using a sine wave function of a lower-order rotational synchronization component as the correction value.

6. The recording device of claim 5, wherein sequentially adjusting the decoding gate interval further comprises using one of amplitude, phase, and frequency of the sine wave function as a parameter.

7. The recording device of claim 5, wherein sequentially adjusting the decoding gate interval comprises storing the correction value, and further comprises using the stored correction value as an initial value in adjusting the decoding gate interval when changing the location of the electromagnetic transducer on the intermediate pattern in response to the self-servo write ending abnormally.

8. The recording device of claim 5, wherein positioning the arm at a location at which the electromagnetic transducer detects a rotational synchronization component of the intermediate pattern comprises:
   moving the arm toward an inner side of the recording medium and to position the electromagnetic transducer at an inner stopper; and
   releasing the electromagnetic transducer from the position of the inner stopper enabling the electromagnetic transducer to detect the rotational synchronization component.

* * * * *